US006455620B1

(12) United States Patent
Cyr et al.

(10) Patent No.: US 6,455,620 B1
(45) Date of Patent: Sep. 24, 2002

(54) POLYETHER CONTAINING POLYMERS FOR OXYGEN SCAVENGING

(75) Inventors: Michael John Cyr, Kingsport, TN (US); Horst Clauberg, Kingsport, TN (US); Mark Edward Stewart, Kingsport, TN (US); Stephen Neal Falling, Kingsport, TN (US); Martin Emerson Rogers, Raleigh, NC (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/630,519

(22) Filed: Aug. 2, 2000

Related U.S. Application Data

(60) Provisional application No. 60/148,168, filed on Aug. 10, 1999.

(51) Int. Cl.[7] .................................................. C08K 5/06
(52) U.S. Cl. ...................................................... 524/376
(58) Field of Search ......................................... 524/376

(56) References Cited

U.S. PATENT DOCUMENTS

| | | | | |
|---|---|---|---|---|
| 3,900,454 A | * | 8/1975 | Sato ........................... 260/88.2 |
| 3,935,141 A | | 1/1976 | Potts et al. | |
| 4,551,509 A | * | 11/1985 | Takayuki ..................... 526/68 |
| 4,915,875 A | * | 4/1990 | Diephouse .................. 552/304 |
| 4,996,015 A | * | 2/1991 | Yoshimoto ............. 264/177.11 |
| 5,077,096 A | * | 12/1991 | Sharaby ................... 427/388.2 |
| 5,106,558 A | * | 4/1992 | Kobayashi .................. 264/119 |
| 5,120,790 A | * | 6/1992 | Yu .............................. 525/186 |
| 5,274,024 A | | 12/1993 | Koyama et al. | |
| 5,275,943 A | * | 1/1994 | Di Turo ....................... 435/179 |
| 5,283,278 A | * | 2/1994 | Daire .......................... 524/399 |
| 5,382,626 A | * | 1/1995 | Credali ........................ 525/126 |
| 5,418,112 A | * | 5/1995 | Mirle ........................... 430/269 |
| 5,502,192 A | * | 3/1996 | Ganci ........................... 546/49 |
| 5,670,468 A | * | 9/1997 | Moens ........................ 510/226 |
| 5,780,283 A | * | 7/1998 | Lee ............................. 435/188 |
| 5,840,443 A | | 11/1998 | Gregg et al. | |
| 5,905,168 A | * | 5/1999 | Santos ........................ 562/590 |
| 5,962,808 A | * | 10/1999 | Lundstrom ................. 149/19.1 |
| 6,017,491 A | * | 1/2000 | Sharaby ......................... 422/7 |
| 6,100,410 A | * | 8/2000 | Tuck ........................... 549/325 |
| 6,103,059 A | * | 8/2000 | Call ............................. 162/65 |
| 6,162,951 A | * | 12/2000 | Polywka ....................... 568/13 |

FOREIGN PATENT DOCUMENTS

| | | |
|---|---|---|
| EP | 301719 A1 | 1/1989 |
| EP | 340637 A2 | 8/1989 |
| WO | WO 98/12127 | 3/1998 |

* cited by examiner

*Primary Examiner*—Paul R. Michl
(74) *Attorney, Agent, or Firm*—Bernard J. Graves, Jr., Esq.; Michael K. Carrier, Esq.

(57) ABSTRACT

The present invention relates to oxygen scavenging compositions comprising an oxidation catalyst and at least one polyether selected from the group consisting of unsubstituted poly(alkylene glycol)s having alkylene chains of 1 to 3 carbon atoms, substituted or unsubstituted poly(alkylene glycol)s having alkylene chains of at least 4 carbon atoms, copolymers of poly(alkylene glycol)s, blends containing poly(alkylene glycol)s and mixtures thereof. The invention further relates to polymers containing said oxygen scavenging compounds and articles made therefrom.

47 Claims, No Drawings

POLYETHER CONTAINING POLYMERS FOR OXYGEN SCAVENGING

CROSS REFERENCES TO RELATED APPLICATIONS

This application claims the benefit of U.S. Provisional Application Ser. No. 60/148,168 filed Aug. 10, 1999.

FIELD OF THE INVENTION

The present invention relates to polymers containing compounds capable of removing oxygen from the materials with which the polymer comes in contact.

BACKGROUND OF THE INVENTION

There are many products, particularly foods and beverages, which are sensitive to oxygen and suffer significant deterioration upon exposure to very low levels of oxygen. To extend the lifetime of oxygen sensitive products such as beer and fruit drinks there are many commercial containers that incorporate oxygen barriers and/or oxygen absorbers (scavengers). In these designs, an oxygen barrier is used to effectively reduce the permeation of oxygen into the package. For extremely sensitive products an oxygen absorber is used to chemically react with any oxygen permeating into the package or any oxygen trapped in the headspace during filling. Through careful design, the use of oxygen barrier and/or scavenger materials results in the creation and maintenance of extremely low oxygen levels within the container.

A polymeric material that is commonly used in packaging applications is polyethylene terephthalate or PET. This material has a number of valuable properties for packaging but lacks sufficient gas barrier for some applications. For example, although PET has adequate oxygen barrier properties for products which are relatively oxygen-insensitive such as carbonated soft drinks, its oxygen permeability limits its use in packaging for beer, fruit juices, other citrus products, tomato based products and aseptically packed meat. Multilayer structures have been proposed to improve PET's gas barrier. Polymers that have excellent oxygen barrier (passive barrier) or scavenging properties (active barrier) are combined with PET to produce a layered structure consisting of the individual polymers. The methods disclosed for producing multilayer structures include co-injection, co-extrusion, lamination, and coating. Polymers which have been used to provide oxygen barrier include EVOH, PVOH, PVDC and polyamides such as m-xylylene diamine adipate. Blends of barrier polymers with PET have also been taught as a method to improve the oxygen barrier of packages. Some examples of polymers that have been blended with PET are PEN, EVOH, m-xylylene diamine adipate, liquid crystal polymers, and Mitsui's B010.

Oxygen scavengers which have been disclosed to be useful include polymers capable of undergoing metal catalyzed oxidation such as m-xylylene diamine adipate or polybutadiene, oxidizable metals such as iron, or reduced anthraquinones. Oxygen absorbers that have been blended into PET include m-xylylene diamine adipate with a cobalt catalyst as well as modified polybutadienes incorporated through a reactive extruder.

Examples of scavengers incorporated into polyesters are known. For example, WO 98/12127 and WO 98/12244 disclose blends of PET containing either oxidizable metals or modified polybutadienes. However, these materials have no passive barrier and are hazy. Further, these blends introduce undesirable contaminants into existing PET recycle streams.

U.S. Pat. No. 5,2736,616 disclose oxygen scavengers containing certain pendant ether moieties. However the general class of polyether compounds of the present invention are not disclosed.

Neiman and Goglev (Vysokomol. Soyed. A9, No. 10, pp.2083–2093, 1967; as translated in Polymer Science U.S.S.R., vol. 9, pp.2351–2363, 1967, pub. 1968) disclose that oxygen is taken up during the thermal degradation of poly(propylene glycol) and poly(ethylene glycol) above their melting point. However, they do not disclose oxygen up-take in blends or copolymers of polyethers with other polymers. Furthermore, they do not disclose scavenging in the solid state or at room temperature. They are also silent on the use of transition metal catalyst or photoinitiators.

WO 99/48963 discloses oxygen scavenging compounds which include a polymer or oligomer having at least one cyclohexene group or functionality and a transition metal compound as a catalyst. Other oxygen scavenging compounds are not disclosed.

WO 99/15433 discloses oxygen scavenging polymeric substances which contain compounds which are devoid of ethylenic unsaturation and specifically a polyether oligomer (specifically polypropylene oxide) and a transition metal catalyst. Other polyethers are not disclosed to be effective scavengers when incorporated into a polymer with a catalyst.

Thus, there are several oxygen barrier and scavenging technologies known in the art, but none fully address the needs for an optimum package.

BRIEF SUMMARY OF THE INVENTION

The present invention relates to oxygen scavenging systems comprising an oxidation catalyst and at least one polyether selected from the group consisting of poly (alkylene glycol)s, copolymers of poly(alkylene glycol)s and blends containing poly(alkylene glycol)s. The oxygen scavenging systems of the present invention are suitable for incorporating into articles containing oxygen-sensitive products. The present invention further relates to novel compositions comprising: a poly(alkylene glycol), an oxidation catalyst and a thermoplastic polymer.

DETAILED DESCRIPTION

The present invention relates to oxygen scavenging systems comprising an oxidation catalyst and at least one polyether selected from the group consisting of unsubstituted poly(alkylene glycol)s having alkylene chains of 1 to 3 carbon atoms, substituted or unsubstituted poly(alkylene glycol)s having alkylene chains of at least 4 carbon atoms, copolymers of poly(alkylene glycol)s and blends containing poly(alkylene glycol)s. The oxygen scavenging systems of the present invention can be incorporated into a variety of polymers. The oxygen scavenging systems of the present invention act as an active oxygen barrier by scavenging oxygen from whatever is in contact with the article containing the oxygen scavenging system.

Polymers comprising the oxygen scavenging systems of the present invention can be used as layers in rigid containers, flexible film and in thermoformed, foamed, shaped or extruded articles and the like for packaging oxygen-sensitive products or use in oxygen sensitive environments. The articles containing the composition limit oxygen exposure by acting as an active oxygen barrier and/or a means for scavenging oxygen from within the article.

Suitable articles include, but are not limited to, film, sheet, tubing, profiles, pipes, fiber, container preforms, blow molded articles such as rigid containers, thermoformed articles, flexible bags and the like and combinations thereof Typical rigid or semi-rigid articles can be formed from plastic, paper or cardboard cartons or bottles such as juice containers, soft drink containers, beer containers, soup containers, milk containers, thermoformed trays or cups. In addition, the walls of such articles often comprise multiple layers of materials. This invention can be used in one, some, or all of those layers.

The first component of the oxygen scavenging systems of the present invention is at least one polyether. Suitable polyethers include unsubstituted poly(alkylene glycol)s having alkylene chains of 1 to 3 carbon atoms, substituted or unsubstituted poly(alkylene glycol)s having alkylene chains of at least 4 carbon atoms and preferably less than 10 carbon atoms. The poly(alkylene glycol)s can be obtained by methods well known in the art. Examples of poly(alkylene glycol)s include poly(ethylene glycol), poly(trimethylene glycol), poly(tetramethylene glycol), poly(pentamethylene glycol), poly(hexamethylene glycol), poly(heptamethylene glycol), and poly(octamethylene glycol). Preferred poly (alkylene glycols) include poly(ethylene glycol) and poly (tetramethylene glycol). Almost any number of repeating units may be used, however, for ease of handling and mixing poly(alkylene glycols) having number average molecular weights in the range of about 500 to about 5,000 are preferred. Suitable poly(alkylene glycol)s may have a variety of suitable end groups, including, but not limited to hydroxyl, epoxy, methyl and the like. Preferred end groups include methyl and hydroxyl.

The amount of the poly(alkylene glycol) may vary, so long as the desired scavenging effect is provided and final composition can be formed into the desired article. Preferred amounts for scavenging include at least about 1 weight % poly(alkylene glycol), preferably at least about 4 weight % and more preferably at least about 8 weight % and most preferably between about 10 and about 15 weight % poly (alkylene glycol). Poly(alkylene glycol) copolymers of various glycol units may also be used in the present invention. The copolymers may be alternating, random, segmented, block, graft, or branched. Examples of poly(alkylene glycol) copolymers include poly(ethylene glycol)-ran-poly (propylene glycol), poly(ethylene glycol)-block-poly (propylene glycol)-block-poly(ethylene glycol) and poly (propylene glycol)-block-poly(ethylene glycol)-block-poly (propylene glycol). Preferred amounts include at least about 2 weight % and preferably at least about 4 weight %.

In addition to poly(alkylene glycol)s, polyethers comprising polymeric or oligomeric ethers derived from cyclic ether monomers can be used as the oxidizable component of the polymer. For example, poly(2,3-dihydrofurandiyl), prepared by cationic polymerization of 2,3-dihydrofuran, can be incorporated into an oxygen scavenging composition in the same fashion as the above-mentioned poly(alkylene glycol) s. Additional examples include polymers derived from monomers of structure I or II, where n +m can be an integer between 3 and 10, and $R_1$, $R_2$, $R_3$, $R_4$, $R_5$, and $R_6$ are independently, a hydrogen atom or a lower alkyl group of 1 to 4 carbons or halogen:

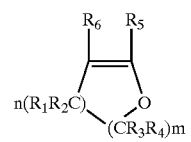

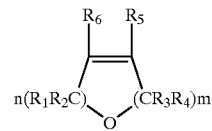

The lower alkyls represented by $R_1$, $R_2$, $R_3$, $R_4$, $R_5$, and $R_6$ in the monomer units I and II may be the same or different and include, alkyls having up to four carbon atoms, such as methyl, ethyl, propyl, isopropyl, butyl, or the like.

It is also possible for the polymeric and oligomeric ethers to be functionalized at their respective terminal ends with reactive functionality for copolymerization, grafting, or reactive extrusion into or on other polymer compositions. These polyethers may have number average molecular weights in the range of about 5,000 to about 200,000 (as determined by gel permeation chromatography using a polystyrene standard) and be used in amounts between about 1 weight % and about 25 weight %.

Cyclical ethers, such as those commonly referred to as crown ethers, can be used as the oxidizable component of the polymer. For example, 18-crown-6 (hexaoxacyclooctadecane, III) can be incorporated into an oxygen scavenging composition in the same fashion as the above-mentioned poly(alkylene glycol)s. Some types of crown ethers are suitably functionalized with reactive groups for copolymerization, grafting, or reactive extrusion into or on other polymer compositions. Those trained in the art should recognize that there are many cyclic ethers available for use without detracting from the intent.

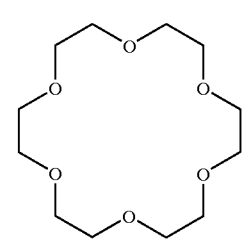

Suitable oxidation catalysts include transition metal catalysts which can readily interconvert between at least two oxidation states. Preferably, the transition metal is in the form of a transition metal salt with the metal selected from the first, second or third transition series of the Periodic Table. Suitable metals include manganese II or III, iron II or III, cobalt II or III, nickel II or III, copper I or II, rhodium II, III or IV and ruthenium I, II or IV. Suitable counterions for the metal include, but are not limited to, chloride, acetate, acetylacetonate, stearate, palmitate, 2-ethylhexanoate, neo-decanoate or naphthenate. The metal salt may also be an ionomer, in which case a polymeric counterion is employed. Such ionomers are well known in the art. Any amount of catalyst which is effective in catalyzing oxygen scavenging may be used. Preferred amounts include at least about 10 ppm, preferably between about 200 and about 500 ppm.

The thermoplastic polymer may be present at concentrations of 0 to 99.99 weight % of the total composition.

Thermoplastic polymers which are suitable in the present invention include polyesters, polyolefins, polyamides, polyurethanes, styrene containing polymers and copolymers, polyacrylates, epoxy-amines, polyvinyl chloride, acrylonitrile containing polymers and copolymers, vinylidene chloride containing polymers and copolymers, polycarbonates, and ethylene copolymers such as ethylene-vinyl acetate, ethylene-vinyl alcohol, ethylene-alkyl (meth) acrylates, ethylene-(meth)acrylic acid and ethylene-(meth) acrylic ionomers. Blends of different thermoplastic polymers may also be used. Preferred thermoplastic polymers for food packaging applications include polyesters, polyamides, polyolefins, polycarbonates and EVOH.

Suitable polyesters include at least one diacid and at least one glycol. The primary dibasic acids are terephthalic, isophthalic, naphthalenedicarboxylic, 1,4-cyclohexanedicarboxylic acid, phenylenedioxydiacetic acid and the like. The various isomers of naphthalenedicarboxylic acid or mixtures of isomers may be used but the 1,4-, 1,5-, 2,6-, and 2,7-isomers are preferred. The 1,4-cyclohexanedicarboxylic acid may be in the form of cis, trans, or cis/trans mixtures. The various isomers of phenylenedioxydiacetic acid or mixtures of isomers may be used but the 1,2-, 1,3-, and 1,4- isomers are preferred. In addition to the acid forms, the lower alkyl esters or acid chlorides may also be used.

The dicarboxylic acid component of the polyester may optionally be modified with up to about 95 mole percent of one or more additional dicarboxylic acids. Such additional dicarboxylic acids include dicarboxylic acids having from 6 to about 40 carbon atoms, and more preferably dicarboxylic acids selected from aromatic dicarboxylic acids preferably having 8 to 14 carbon atoms, aliphatic dicarboxylic acids preferably having 4 to 12 carbon atoms, or cycloaliphatic dicarboxylic acids preferably having 7 to 12 carbon atoms. Examples of suitable dicarboxylic acids include phthalic acid, isophthalic acid, naphthalene-2,6-dicarboxylic acid, cyclohexanedicarboxylic acid, cyclohexanediacetic acid, diphenyl-4,4'-dicarboxylic acid, 1,3-phenylenedioxydiacetic acid, 1,2-phenylenedioxydiacetic acid, 1,4-phenylenedioxydiacetic acid, succinic acid, glutaric acid, adipic acid, azelaic acid, sebacic acid, and the like. Polyesters may be prepared from one or more of the above dicarboxylic acids. Preferably said dicarboxylic acid comprises up to about 25 mole %, and more preferably 15 mole % at least one additional dicarboxylic acid.

Typical glycols used in the polyester include aliphatic glycols containing from two to about ten carbon atoms, and cycloaliphatic glycols containing 7 to 14 carbon atoms. Preferred glycols include ethylene glycol, 1,4-butanediol, 1,6-hexanediol, 1,4-cyclohexanedimethanol, diethylene glycol and the like. The glycol component may optionally be modified with up to about 50 mole percent, preferably up to about 25 mole % and most preferably up to about 15 mole % of one or more different diols. Such additional diols include cycloaliphatic diols preferably having 6 to 20 carbon atoms, aromatic diols containing from 6 to 15 carbon atoms or aliphatic diols preferably having 3 to 20 carbon atoms. Examples of such diols include: diethylene glycol, triethylene glycol, 1,4-cyclohexanedimethanol (when using 1,4-cyclohexanedimethanol, it may be the cis, trans or cis/trans mixtures), propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1, 3), 2-ethylhexanediol-(1,3), 2,2-diethylpropane-diol-(1,3), hexanediol-(1,3), 1,4-di-(2-hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, 1,3-bis(2-hydroxyethoxy)benzene, 1,4-bis(2-hydroxyethoxy)benzene, 2,2-bis-(4-hydroxypropoxyphenyl)-propane, 4,4'-sulfonyldiphenol, resorcinol, hydroquinone and the like. Polyesters may be prepared from one or more of the above diols.

The polyester resin may also contain small amounts of trifunctional or tetrafunctional comonomers such as trimellitic anhydride, trimethylolpropane, pyromellitic dianhydride, pentaerythritol, and other polyester forming polyacids or polyols generally known in the art.

The polyesters of the present invention can be made by conventional processes well known in the art, and need not be described here.

Suitable polyolefins of the present invention include mono- and diolefins, for example polypropylene, polyisobutylene, polybut-1-ene, poly-4-methylpent-1-ene, polyisoprene, or polybutadiene, and also polymers of cycloolefins, for example cyclopentene or norbornene; furthermore polyethylene (which can be crosslinked), for example high-density polyethylene (HDPE), high-density polyethylene of high molar mass (HDPE-HMW), high-density polyethylene of ultra high molar mass (HDPE-UHMW), medium-density polyethylene (MDPE), low-density polyethylene (LDPE), linear low-density polyethylene (LLDPE) and branched low-density polyethylene (VLDPE).

Mixtures of the polymers described above, for example mixtures of polypropylene with polyisobutylene, polypropylene and polyethylene (e.g. PP/HDPE, PP/LDPE) and mixtures of different types of polyethylene (e.g. LDPE/ BHDPE).

Suitable copolymers of monoolefins and diolefins with each other or with other vinyl monomers are disclosed in WO 97/30112 and W097/11993.

Suitable polyamides include partially aromatic polyamides, aliphatic polyamides, wholly aromatic polyamides and mixtures thereof By "partially aromatic polyamide" it is meant that the amide linkage of the partially aromatic polyamide contains at least one aromatic ring and a nonaromatic species.

Wholly aromatic polyamides comprise in the molecule chain at least 70 mole % of structural units derived from m-xylylene diamine or a xylylene diamine mixture comprising m-xylylene diamine and up to 30% of p-xylylene diamine and an αε-aliphatic dicarboxylic acid having 6 to 10 carbon atoms, which are further described in Japanese Patent Publications No., 1156/75, No. 5751/75, No. 5735/75 and No. 10196/75 and Japanese Patent Application Laid-Open Specification No. 20 29697/75.

Polyamides formed from isophthalic acid, terephthalic acid, cyclohexanedicarboxylic acid, meta- or para-xylylene diamine, 1,3- or 1,4-cyclohexane(bis)methylamine, aliphatic diacids with 6 to 12 carbon atoms, aliphatic amino acids or lactams with 6 to 12 carbon atoms, aliphatic diamines with 4 to 12 carbon atoms, and other generally known polyamide forming diacids and diamines can be used. The low molecular weight polyamides may also contain small amounts of trifunctional or tetrafunctional comonomers such as trimellitic anhydride, pyromellitic dianhydride, or other polyamide forming polyacids and polyamines known in the art.

Preferred partially aromatic polyamides include: poly(m-xylylene adipamide), poly(hexamethylene isophthalamide), poly(hexamethylene adipamide-co-isophthalamide), poly (hexamethyl adipamide-co-terephthalamide) and poly (hexamethylene isophthalamide-co-terephthalamide). The most preferred partially aromatic polyamide is poly(m-xylylene adipamide).

Preferred aliphatic polyamides include polycaprolactam (nylon 6), poly- aminoheptanoic acid (nylon 7), poly-aminonanoic acid (nylon 9), polyundecane-amide (nylon 11), polylaurolactam (nylon 12), polyethylene-adipamide (nylon 2,6), polytetramethylene-adipamide (nylon 4,6), polyhexamethylene-adipamide (nylon 6,6) polyhexamethylene-sebacamide (nylon 6,10), polyhexamethylene-dodecamide (nylon 6,12), polyoctamethylene-adipamide (nylon 8,6), polydecamethylene-adipamide (nylon 10,6), polydodecamethylene-adipamide (nylon 12,6) and polydodecamethylene-sebacamide (nylon 12,8). The most preferred aliphatic polyamide is poly(hexamethylene adipamide). Partially aromatic polyamides, are preferred over the aliphatic polyamides where good thermal properties are crucial.

The polyamides of the present invention can be made by conventional processes well known in the art, and need not be described here.

Various additives, which are known in the art may also be included in the thermoplastic polymers of the present invention. Such additives include, but are not limited to colorants, pigments, toners, carbon black, glass fibers, fillers, impact modifiers, antioxidants, stabilizers, flame retardants, reheat aids, acetaldehyde reducing compounds, adhesion promoters, recycling release aids, passive barrier aids and the like.

The poly(alkylene glycol) may either be physically blended with the thermoplastic polymer, covalently bound to the thermoplastic polymer in the form a copolymer or combinations thereof.

The physical blends may be prepared by combining the poly(alkylene glycol) and thermoplastic polymer using melt blending equipment such as Brabender extruder equipment, single-screw extruders, twin-screw extruders and the like. Properties of the blends may be altered significantly depending on the mixing temperature and mixing time. The poly (alkylene glycol) and thermoplastic polymer may be combined just prior to film or sheet extrusion or injection molding into an article.

Thermoplastic polymers copolymerized with poly (alkylene glycol)s may also be blended with the thermoplastic polymers. For example, thermoplastic elastomers containing polytetramethylene glycol such as DuPont's HYTREL, Atofina's PEBAX or Eastman Chemical Company's ECDEL may be blended with a thermoplastic polymer such as PET.

Those skilled in the art will recognize that many polymer/poly(alkylene glycol) combinations are possible without detracting from the spirit of this invention.

Poly(alkylene glycol)s may be covalently bound to the thermoplastic polymer to form a copolymer. The poly (alkylene glycol)/thermoplastic polymer copolymer may be a segmented copolymer, a block copolymer or a graft copolymer. Examples of poly(alkylene glycol)/thermoplastic polymer copolymers that may be used in the oxygen scavenging composition include but are not limited to polyester/poly(alkylene glycol), polyamide/poly(alkylene glycol), polyurethane/poly(alkylene glycol), polyolefin/polyalkylene glycol, acrylic/poly(alkylene glycol) and polycarbonate/poly(alkylene glycol) copolymers. Ethylene-vinyl alcohol/poly(alkylene glycol) graft copolymers may also be used in the present invention.

A polyester/poly(alkylene glycol) copolymer can be formed from at least one diacid, at least one glycol and at least one poly(alkylene glycol). The composition of the poly(alkylene glycol) is described above and will have either hydroxyl, epoxy, carboxylic acid or amine end groups and either be monofunctional or difunctional. The polyester/poly (alkylene glycol) copolymer may contain up to 99 weight percent of the poly(alkylene glycol). The composition of the polyester in the polyester/poly(alkylene glycol) copolymer is the same as the thermoplastic polyesters described above.

Polyester/poly(alkylene glycol) copolymers can be produced by conventional, well-known processes. One such process is the esterification of one or more dicarboxylic acids with one or more glycols. In another process, one or more dialkyl esters of dicarboxylic acids undergo transesterification with one or more glycols in the presence of a catalyst such as a salt of manganese, zinc, cobalt, titanium, calcium, magnesium or lithium. In either case, the monomer and oligomer mixture is typically produced continuously in a series of one or more reactors operating at elevated temperature and pressures at one atmosphere or greater. Alternately, the monomer and oligomer mixture could be produced in one or more batch reactors. Suitable conditions for esterification and transesterification include temperatures between 200 to about 250° C. and pressures of about 0 to about 80 psig. It should be understood that generally the lower the reaction temperature, the longer the reaction has to be conducted.

Next, the mixture of polyester monomer and oligomers undergoes melt-phase polycondensation to produce a low molecular weight precursor polymer. The precursor is produced in a series of one or more reactors operating at elevated temperatures. To facilitate removal of excess glycols, water, alcohols, aldehydes, and other reaction products, the polycondensation reactors are run under a vacuum or purged with an inert gas. Inert gas is any gas not causing an unwanted reaction. Suitable gases include, but are not limited to partially or fully dehumidified air, $CO_2$, argon, helium and nitrogen. Catalysts for the polycondensation reaction include salts of antimony, germanium, tin, lead, or gallium, preferably antimony or germanium. Reaction conditions for polycondensation include a temperature less than about 290° C., and preferably between about 240° C. and about 290° C. at a pressure sufficient to aid in removing undesirable reaction products such as ethylene glycol. Precursor inherent viscosity (IhV) is generally below about 1.5 dL/g. The target IhV is generally selected to balance good color and minimize the amount of solid stating required. IhV was measured at 25° C. using 0.50 grams of polymer per 100 ml of a solvent consisting of 60% by weight phenol and 40% by weight tetrachloroethane. The low molecular weight precursor polymer is typically produced continuously in a series of one or more reactors operating at elevated temperature and pressures less than one atmosphere. Alternately low molecular weight precursor polymer could be produced in one or more batch reactors.

After pelletization of the low molecular weight precursor polymer, the pellets may be fed directly into an extruder, or solid stated at conventional conditions until the desired molecular weight is attained.

Another key feature of the invention is that the precursor is crystallized and undergoes further polycondensation in the solid state by conventional, well-known processes, such as those disclosed in U.S. Pat. No. 4,064,112. Solid state polycondensation can be conducted in the presence of an inert gas as defined above, or under vacuum conditions, and in a batch or continuous process. The polyester can be in the form of pellets, granules, chips or powder.

The poly(alkylene glycol) may be added directly into the melt phase reactor during esterification, prepolymer or polycondensation stages. If this method is used it is desirable to add the poly(alkylene glycol) at a point in the reactors where there is good mixing to insure homogeneous distribution of the poly(alkylene glycol) throughout the polymer melt. The poly(alkylene glycol) may be added undiluted directly to the polymer melt or incorporated into a liquid carrier and added to the polymer melt. If a liquid carrier is used the poly (alkylene glycol) may be incorporated into the liquid carrier at concentrations of 1 to 99 weight percent. The liquid carrier may be any organic solvent or water. Preferably, the liquid carrier is ethylene glycol.

In an alternate embodiment the poly(alkylene glycol) may be added to the molten polyester composition after completion of polycondensation but prior to strand extrusion and pelletizing. This addition may be accomplished in a variety of ways. For example, the poly(alkylene glycol) may be added undiluted or incorporated into a low molecular weight, polymeric or liquid carrier prior to addition to the molten polyester.

In another embodiment the poly(alkylene glycol) may reacted with the thermoplastic polymer, (c), in a reactive extrusion or reactive compounding step that is performed subsequent to manufacture of the thermoplastic polymer, (c). Conditions of the operation can be adjusted to provide varying degrees of reaction between the poly(alkylene glycol) and the thermoplastic polymer, (c).

The method of this invention can initiate oxygen scavenging in a composition, layer, or packaging article solely prepared from the oxidizable organic compound and transition metal catalyst without photoinitiator. However, components such as photoinitiators or antioxidants can be added to further facilitate or control the initiation of the oxygen scavenging properties.

For instance, it is often preferable to add a photoinitiator, or a blend of different photoinitiators, the compositions used to prepare the oxygen scavenger, if any antioxidants are included to prevent premature oxidation of that composition.

Suitable photoinitiators are well known to those skilled in the art. Preferably, photoinitiators have little absorbance in the visible range (greater than about 400 nm), good absorbance outside the absorbance range for the thermoplastic polymer and have low volatility at temperatures used for their incorporation. Specific examples include, but are not limited to 2,3-butanedione, substituted aryl ketones, such as benzophenone, o-methoxybenzophenone, acetophenone, o-methoxy-acetophenone, acenaphthenquinone, methyl ethyl ketone, valerophenone, hexanophenone, α-phenylbutyrophenone, p-morpholinopropiophenone, dibenzosuberone, 4-morpholinobenzophenone, benzoin, benzoin methyl ether, 4-o-morpholinodeoxybenzoin, p-diacetylbenzene, 4-aminobenzophenone, 4'-methoxyacetophenone, α-tetralone, 9-acetylphenanthrene, 2-acetylphenanthrene, 10-thioxanthenone, 3-acetylphenanthrene, 3-acetylindole, 9-fluorenone, 1-indanone, 1,3,5-triacetylbenzene, thioxanthen-9-one,xanthene-9-one, 2(4) isopropyl thioxanthen-9-one, 7H-benz[de]anthracen-7-one, benzoin tetrahydropyranyl ether, 4,4'-bis(dimethylamino)-benzophenone, 1'-acetonaphthone, 2'-acetonaphthone, acetonaphthone, benz[a]anthracene-7,12-dione, 2,2-dimethoxy-2-phenylacetophenone, α,α-diethoxyacetophenone, α,α-dibutoxyacetophenone, and the like. Singlet oxygen generating photosensitizers such as Rose Bengal, methylene blue, tetraphenyl porphyrin, and zinc phthalocyanine may also be employed as photoinitiators as well. Polymeric photoinitiators include poly(ethylene carbon monoxide), and oligo[2-hydroxy-2-methyl-1-[4-(1-methylvinyl)phenyl]propanone]. Use of a photoinitiator is preferable because it generally provides faster and more efficient initiation. When actinic radiation is used, the initiators may also provide initiation at longer wavelengths that are less costly to generate and are less harmful. Preferred initiators include 10-thioxanthenone, thioxanthen-9-one, xanthene-9-one and 2(4) isopropyl thioxanthen-9-one. Suitable amounts include any amount capable of initiating scavenging and preferable from about 10 ppm to about 10,000 ppm (1 wt %).

Antioxidants may also be added. Suitable antioxidants include hindered phenols, phosphites, primary or secondary antioxidants, hindered amine light stabilizers and the like. Antioxidants such as 2,6-di-(t-butyl)-4-methylphenol (BHT), 2,2'-methylene-bis(6-t-butyl-p-cresol), triphenylphosphite, tris-(nonylphenyl)phosphite, Irganox 1010 and dilaurylthiodipropionate would be suitable, but not limited to, for use with this invention. Suitable amounts include any amount capable of suppressing oxidative degradation and preferable from about 10 ppm to about 10,000 ppm (1 wt %).

As mentioned above, antioxidants may be used with this invention to control scavenging initiation. An antioxidant as defined herein is any material that inhibits oxidative degradation or cross-linking of polymers. Typically, such antioxidants are added to facilitate the processing of the polymeric materials and/or prolong their useful lifetime. In relation to this invention, such additives prolong the induction period for oxygen scavenging given an insufficient thermal history or in the absence of irradiation (photoinitiation). Then when the layer's or article's scavenging properties are required, the layer or article (and any incorporated photoinitiator) can be exposed to radiation, or alternatively, exposed to a sufficient temperature profile.

This material can be used as a layer in a multilayer structure, prepared by co-injection, co-extrusion, lamination, and coating. These multilayer structures can be formed into articles by any forming technique known in the art such as blow molding, thermoforming, and injection molding. When the poly(alkylene glycol) is incorporated into polyester, its interfacial properties will be better matched with adjacent layers of PET or other polyesters which will minimize delamination problems, thereby removing the possibility of structural failure or reduced clarity. Also, since the entire structure will be a polyester, existing recycling mechanisms will still be available for use.

Incorporating a poly(alkylene glycol) with a gas barrier polymer such EVOH will result in a material that has both gas barrier and oxygen scavenging properties. These compositions would be particularly useful in applications such as beer packaging requiring barrier to carbon dioxide egress and very low oxygen ingress.

Alternatively, the oxygen scavenging compositions of the present invention may be incorporated into one layer, and a gas barrier polymer may be incorporated into another. Suitable multilayer structures include three layer structures where the oxygen scavenging compound is incorporated into center layer, four layer structures where the oxygen scavenging compound is incorporated into at least one of the intermediate layers and five layer structures where the oxygen scavenging compound may be incorporated into either the center layer or the second and fourth layers. In four and five layer articles the additional internal layers may comprise performance polymers such as barrier polymers, recycled polymer and the like. Additionally the oxygen scavenging compounds of the present invention may be blended with recycled polymers. Generally the inner and outermost layers will be made from virgin polymer which is suitable for the desired end use. Thus, for example, for a food or beverage container, the inner and outermost layers would be made from a suitable polyester, such as PET.

This invention can be further illustrated by the following examples of preferred embodiments thereof, although it will be understood that these examples are included merely for purposes of illustration and are not intended to limit the scope of the invention unless otherwise specifically indicated.

EXAMPLES 1–6

Melt blends were prepared from PTMG-1000 (polytetramethylene glycol with a number average molecular weight of 1000) and the following polyesters (acid functional repeat units and glycol functional repeat units are independently summed to 100 mole %):

TABLE 1

| Ex. # | TPA (mol %) | IPA (mol %) | EG (mol %) | CHDM (mol %) | Ih. V. (dL/g) |
|---|---|---|---|---|---|
| 1 | 100 | 0 | 95.5–97.5 | 2.5–4.5 | 0.76 |
| 2 | 100 | 0 | 85–90 | 10–15 | 0.70 |
| 3 | 100 | 0 | 65–71 | 29–35 | 0.75 |
| 4 | 60–70 | 30–40 | 0 | 100 | 0.71 |
| 5 | 0* | 0* | 0 | 100 | 0.82 |
| 6 | 96–98 | 2–4 | 100 | 0 | 0.76 |

TPA = terephthalic acid
IPA = isophthalic acid
CHDM = 1,4-cyclohexane dimethanol
*Example 5 contained 100 mole % 1,4-cyclohexane dicarboxylic acid 22.5 weight % cobalt TEN-CEM (OMG Americas, Westlake, Ohio) and 4,4'-bis(diethylamino)benzophenone (Aldrich Chemical Company) were also added.

Inherent viscosities, (Ih.V.), were determined at 25° C. and atmospheric pressure by measuring the solution viscosity and using an established correlation to relate solution viscosity to inherent viscosity. The solvent was a 60/40 (w/w) phenol/tetrachloroethane mixture and the polymer concentration was 0.5 weight percent.

The blends were prepared by compounding using a Werner & Pfleiderer (Krupp Werner & Pfleiderer Corporation) co-rotating, intermeshing twin screw extruder with a 30 mm diameter screw and a length to diameter ratio (L:D) of 36:1. The polyester, TEN-CEM cobalt salt and 4,4'-bis(diethylamino) benzophenone were fed as solids into the feed throat of the extruder. The PTMG was liquefied by heating to approximately 50° C. and the liquid was injected into the melt. Feed rates were adjusted to produce samples with 5 wt % polyether, 1 wt % 4,4'-bis(diethylamino) benzophenone and 500 ppm cobalt(II) ion catalyst concentration at a total feed rate of approximately 30 lbs/hr. Heater set temperatures and screw speed were adjusted to maintain the screw torque between 40 and 70% of the maximum recommended torque for the extruder drive. Resulting melt temperatures (as measured by a thermocouple mounted so as to protrude into the melt stream in the extruder die) were on the order of 220 to 250° C. Prior to the compounding, solid polymers and additives were dried to remove excess moisture. The molten materials were extruded into a water bath and then pelletized.

Films having thickness of approximately 0.005 inches (125 microns) were extruded from each mixture using a 1-inch diameter single screw extruder (Killion Extruders, Davis Standard Corporation) equipped with a film die. The molten material was quenched by casting onto a polished metal roll and collected. Prior to extrusion, all materials were dried to remove excess moisture and minimize degradation.

The ability of films to scavenge oxygen was assessed using a Columbus Instrument, Inc. Micro Oxymax respirometer. The Micro Oxymax is an indirect "closed-circuit" respirometer. The integrated instrument is specially designed to detect extremely low levels of oxygen consumption. Prior to testing, samples were exposed to UV light to initiate the scavenging reaction. Film samples were exposed in an Atlas SunChex UV chamber for 2.5 minutes on each side. The energy flux during the treatment was about 0. 15 W/m$^2$ at 340nm. After UV exposure, approximately 5 grams of a test film were loaded into the test vessel and connected to the respirometer.

The operation of the Micro Oxymax respirometer is based on the principle that the consumption of a gas in a closed system may be calculated by multiplying the change in the gas concentration, measured with an oxygen battery (fuel cell), on two consecutive readings by the volume of the gas. Then, the rate of gas production or consumption may be obtained by dividing the result by the time interval between the readings (four hours for these examples). The results were corrected for barometric pressure and temperature and normalized to STP. Changes in the sensitivity of the detector are corrected by measuring a reference volume before and after measuring the samples. The measurement process consists of measuring the concentration of oxygen in the air in the sensors and in the air in each measuring chamber. The Micro Oxymax circulates the air in the chamber through the sensor, measures the concentration, and returns the air back to the chamber continuously during the measurement process. The sensor is purged with fresh air before each measurement, so the small amount of air in the sensor mixes with the air in the chamber and helps keep the sample at a consistent oxygen level. If the level of oxygen drops below approximately 20.4% (0.5% lower than the initial concentration) the system will flush the chamber with fresh air. This principle of measurement is the subject of U.S. Pat. No. 4,947,339, which is incorporated herein by reference.

Instantaneous oxygen consumption rates (in microliters STP of oxygen per minute) and cumulative consumption (in microliters STP of oxygen) at 200 hours are reported in Table 2, below.

TABLE 2

| Ex. # | sample wt (gm) | Oxygen consumption ($\mu$l O$_2$/min) | Cumulative consumption ($\mu$l O$_2$) |
|---|---|---|---|
| 1 | 5.5 | 0.5 | 6800 |
| 2 | 5.9 | 0.7 | 10,000 |
| 3 | 4.6 | 0.1 | 1100 |
| 4 | 5.3 | 0 | 840 |
| 5 | 5.0 | 0 | 40 |
| 6 | 5.6 | 0.2 | 4400 |

These examples demonstrate that polytetramethylene glycol polyether can be incorporated into a wide range of polymers and that the resulting compositions of this invention are effective oxygen scavengers.

EXAMPLES 7 and 8

The polyesters of Examples 4 and 5 were compounded with additives and polyether using the processing conditions and equipment as described in those Examples, except that varying amounts of polyethylene glycol having a number average molecular weight of 1450 was used in place of PTMG. The PEG was melted at 50° C. before use. The compositions are shown in Table 3, below.

TABLE 3

| Ex. # | polyester | photoinitiator % | Co(III)ion (ppm) | PMDA (wt %) | PEG (wt %) |
|---|---|---|---|---|---|
| 7 | Ex. 5 | 0.1 | 500 | 0.1 | 5 |
| 8 | Ex. 4 | 0.1 | 500 | 0.1 | 3 | photoinitiator was 4,4'-bis(diethylamino)benzophenone (Aldrich Chemical Company).
Cobalt was added as 22.5% Cobalt TEN-CEM.
PMDA is 1,2,4,5-benzenetetracarboxlic dianhydride (Aldrich Chemical Company).

Films were prepared from these blends and exposed to UV light as previously described for Examples 1–6, above. The films were cut into small pieces (approximately 1 cm$^2$) and tested for oxygen uptake in the Micro Oxymax respirometer. Respirometer results are shown in Table 4, below.

TABLE 4

| Ex. # | sample wt (gm) | Oxygen consumption ($\mu$l O$_2$/min) | Cumulative consumption ($\mu$l O$_2$) |
|---|---|---|---|
| 7 | 4.5 | 1.5 | 26,000 |
| 8 | 5.7 | 0.25 | 5,200 |

These examples demonstrate that compositions of this invention containing polyethylene glycol polyether are also effective as oxygen scavengers.

EXAMPLES 9–14

Melt blends were prepared from PTMG-1000, PET homopolymer having an inherent viscosity about 0.76 dL/g (PET9663 from Eastman Chemical Company), 22.5% Cobalt TEN-CEM, and 2(4)-isopropyl-9H-thioxanthen-9-one (Aldrich Chemical Company). The blending followed the same general procedures as that used for Examples 1 to 6, except the amount of PTMG and additives were varied as shown in Table 4, below. The screw torque for Example 14 (containing only PET) was approximately 80–90% of the maximum recommended value. Extruder settings were adjusted to yield melt temperatures in the range of 250 to 270° C.

The resulting blends were ground to pass through a 2mm screen. Approximately 5 grams of each ground material was placed in aluminum weighing pans and then exposed to UV light for 4 minutes (with gentle agitation after 2 minutes). The energy flux during the treatment was approximately 0.12 to 15 W/m$^2$ at 340 nm. After UV exposure, approximately 5 grams of each material were loaded into a respirometer test vessel. The results are shown in Table 6, below.

TABLE 6

| Ex # | PTMG (wt %)* | Cobalt (II) ion (ppm) | 2(4)-isopropyl-9H-thioxanthen-9-one (%) | Oxygen consumption ($\mu$l O$_2$/min) | Cumulative consumption ($\mu$l O$_2$) |
|---|---|---|---|---|---|
| 9 | 0 | 0 | 0 | 0 | 0 |
| 10 | 4 | 0 | 0 | 0 | 0 |
| 11 | 0 | 500 | 0.1 | 0 | 0 |
| 12 | 1 | 500 | 0.1 | 0.03 | 370 |
| 13 | 2 | 500 | 0.1 | 0.14 | 1700 |
| 14 | 4 | 500 | 0.1 | 0.24 | 3000 |

*approximate weight after blending

These examples demonstrate that significant scavenging occurs only in the samples that contain both catalyst (cobalt) and polyether. They also demonstrate that detectable scavenging occurs in samples with as low as 1 wt % polyether, but higher levels are preferred for effective scavenging.

EXAMPLES 15–17

Several melt blends containing PET 9921 (repeat units from 100 mol % terephthalic acid, 98 to 99 mol % ethylene glycol and 1 to 2 mol % 1,4-cyclohexane dimethanol, inherent viscosity about 0.76 dL/g -from Eastman Chemical Company), 4 wt % of polytetramethylene glycol having varying number average molecular weights, 0.1 wt % 2(4)-isopropyl-9H-thioxanthen-9-one (First Chemical, Pascagoula, Miss.), 22.5% Cobalt TEN-CEM to provide a 500 ppm cobalt(II) ion concentration, and 0.14 wt % PMDA were prepared using the general procedure described in Examples 1–6. The molecular weights of the polytetramethylene glycols used are listed in Table 7 and are available from Dupont as Terathane 650 and Terathane 2000, respectively.

Samples were ground, exposed to UV light and tested in the respirometer following the general procedure described for Examples 9–14. The respirometer results are also shown in Table 7.

TABLE 7

| Ex. # | PTMG Mw$_{na}$ | sample wt (gm) | Oxygen consumption ($\mu$l O$_2$/min) | Cumulative consumption ($\mu$l O$_2$) |
|---|---|---|---|---|
| 15 | 650 | 5 | 0.01 | 220 |
| 16 | 2000 | 5 | 0.06 | 720 |
| 17 | 1000 | 5 | 0.06 | 920 |

These examples demonstrate the effectiveness of polyethers having different molecular weights.

EXAMPLES 18 AND 19

Polyester-polyether copolymer was prepared using the following procedures: Synthesis of polyester-polyether copolymer with 15wt % polyether target: Dimethyl terephthalate (26.05 lbs), ethylene glycol (16.37 lbs), PTMG-1000 (4.50 lbs), Irganox 1010 (Ciba Corp., Tarrytown, N.Y.; 13.62 g) and catalyst solution were charged under nitrogen (10 SCFH) to an 18 gallon stainless steel reactor equipped with water condenser, column, and stirrer. The contents, which were stirred continuously during the polymerization reaction, were heated under nitrogen to 200° C. and held for 2 hrs, and then heated to 220° C. and held for 2 hours until the methanol by-product was sufficiently removed. The temperature was ramped to 275° C. while the pressure was decreased at a rate of 13mmHg/minute. The polymer was held at 275° C. and less than 4 mm Hg for 2 hours. The reaction vessel was then pressurized slightly with nitrogen and the product extruded onto dry ice. After the polymer crystallized and cooled, it was ground. A total of 23 lbs of polyester-polyether copolymer was produced with an inherent viscosity of 0.71 dL/g. The PTMG-1000 level was 15 wt % as confirmed by proton NMR.

EXAMPLE 20

Synthesis of polyester-polyether copolymer with 25 wt % polyether target: Dimethyl terephthalate (46.40 lbs), ethylene glycol (28.74 lbs), PTMG-1000 (15.00 lbs), Irganox 1010 (27.40 g) and catalyst solution were charged under nitrogen (10 SCFH) to a stainless steel reactor and polymerized using a similar procedure to that described above. A total of 44 lbs of polyester-polyether copolymer was prepared with an inherent viscosity of 0.75 dL/g. The PTMG-1000 level was 22 wt % as confirmed by proton NMR.

EXAMPLE 21

Synthesis of polyester-polyether copolymer with 4 wt % polyether target: Dimethyl terephthalate (30.31 lbs), ethylene glycol (19.38 lbs), PTMG-1000 (544.80 g lbs), Irganox 1010, catalyst solution were charged under nitrogen (10 SCFH) to an 18 gallon stainless steel reactor equipped with water condenser, column, and stirrer. The contents, which were stirred continuously during the polymerization reaction, were heated under nitrogen to 200° C. and held for 2 hrs, and then heated to 220° C. and held for 1 hour until the methanol by product was sufficiently removed. Additional polymerization catalyst was then added. The temperature was then ramped to 285° C. while the pressure was decreased at a rate of 13mmHg /minute. The polymer was held at 285° C. and less than 4 mm Hg for 1.5 hours. The reaction vessel was then pressurized slightly with nitrogen and extruded onto dry ice. After crystallization and cooling, the copolymer was ground. A total of 21 lbs of polyester-polyether copolymer was produced with an inherent viscosity of 0.63 dL/g. The material was then polymerized in the solid state at 215° C. for 16 hours to a final inherent viscosity of 0.80 dL/g. The PTMG-1000 level was 3.6. wt % as confirmed by proton NMR.

EXAMPLES 18–21

Compounding

The polymers made in Examples 18–20 were compounded with varying amounts of 22.5% Cobalt TEN-CEM and 2(4)-isopropyl-9H-thioxanthen-9-one following the same general procedure as described in Examples 1–6, except that all components were fed as solids. Processing set points and conditions were adjusted to yield a melt temperature of approximately 255 to 275° C. The material was quenched in a water bath and pelletized. Compositions of the examples are given in Table 8.

TABLE 8

| Ex. # | Cobalt (II) ion (ppm) | polyether (wt %) | photoinitiator (%) |
|---|---|---|---|
| 18 | 500 | 15 | 0.1 |
| 19 | 0 | 15 | 0 |
| 20 | 250 | 22 | 0.1 |
| 21 | 500 | 4 | 0.1 |

Samples of the materials were ground, exposed to UV light and tested in the respirometer as described in Examples 9 to 14 above. The results are shown in Table 9, below.

Material from examples 18 and 19 were extruded into films using the same general procedure used for Examples 1 to 6.

A film was melt pressed from the material of Example 21 using the following procedure:

The compounded polymer of Example 21 was ground to pass through a 2 mm screen and crystallized in a vacuum oven with slow nitrogen purge under a vacuum of about 25 in Hg at 155° C. for 2 hours. Approximately 4 grams of the crystallized material were spread evenly in the center of a 6 in.×6 in. silicon treated photographic plate. A metal shim measuring 0.005 in. was placed around the polymer granules to control the thickness and a second photographic plate was placed on top. The granules were pressed into films using a PASADENA hydraulic press. The granules were pre-heated at 270° C. –285° C. for one to two minutes. After pre-heating pressure was gradually applied to the photographic plates from 0–14000 lb over a 15 second span. The molten material was held at this pressure for 15–30 seconds and then immediately quenched in ice water. The resulting films were approximately 4 in. ×4 in. with a thickness of 0.005 in. –0.006 in.

The apparent oxygen permeability for these film samples was determined in general accordance with the procedure outlined in ASTM D3985-81 (reapproved in 1988). This testing was performed on Mocon OX-TRAN instruments (Modern Controls, Inc.) at 30° C. with humidified gases, 21% oxygen upstream and some of the calculations computerized. Samples were maintained on the instrument for several weeks. The haze of these samples was determined using a test method which is in general accordance with ASTM D1003-92. Haze measurements were performed using a Hunter Lab Ultrascan instrument. Oxygen permeability and haze results are shown in Table 9.

TABLE 9

| Ex. # | Respirometer rate at 200 hrs ($\mu$l/min) | Cumulative consumption ($\mu$l $O_2$) | Apparent oxygen permeability (c(STP)mil/100 in$^2$/day/atm)* | haze (%) |
|---|---|---|---|---|
| 18 | 1.1 | 27,000 | 0 | 1.4 |
| 19 | NT | NT | 29 | 1.4 |
| 20 | 2.6 | 79,000 | NT | NT |
| 21 | 0 | 190 | 10.5 | 1.5 |

*after 25 days in test
NT = this test was not performed on this sample

Examples 18 through 21 demonstrate the effectiveness of 250 ppm cobalt at catalyzing the scavenging reaction. They also demonstrate that polyether copolymers are effective scavengers and that a wide range of polyether content is effective. Finally these examples demonstrate that compositions of the present invention can yield materials with an attractive combination of both low oxygen transmission rate and low haze (<5% haze at 5-mil thickness).

EXAMPLES 22 THROUGH 25

The following polyether copolymers were obtained from commercial sources:

EXAMPLE 22

HYTREL 7246 a poly(butylene terephthalate) -PTMG copolymer from E. I. du Pont de Nemours and Company.

EXAMPLES 23 AND 24

PEBAX MV 1074 and 7033 polyamide-polyether copolymers from Atofina. Compositions of the copolymers are shown in Table 10.

EXAMPLE 25

ECDEL 9967 a polyester-polyether copolymer from Eastman Chemical Company with approximately 25 weight % polyether. (Inherent viscosity about 1.2 dL/g).

EXAMPLES 26 AND 27

Polyester-polyether copolymers were synthesized following the general procedures outlined in Examples 18 through 21. Amounts and types of starting materials and polymerization conditions were adjusted to yield polymers with the compositions and inherent viscosity values given in Table 10 below.

TABLE 10

| Ex # | TPA mol % | EG mol % | CHDM mol % | PTMG mol % | polyether* wt % | Ih.V. |
|---|---|---|---|---|---|---|
| 26 | 100 | 65 | 27 | 8 | 28 | 0.89 |
| 27 | 100 | 80 | 0 | 20 | 52 | 1.1 |

*concentration in final polymer

EXAMPLES 28–33

The polyester-ethers of Examples 26 and 27 were blended with PET (9663, commercially available from Eastman Chemical Company), TEN-CEM cobalt salt and 2(4)-isopropyl-9H-thioxanthen-9-one. Compositions of the blends are listed in Table 11 Melt blending, and subsequent treatment and testing of Examples 26 and 27 followed the same general procedure as that given for Examples 18 to 20.

Compounding Examples 22 through 25 was performed using a concentrate approach. For these samples, the polyether copolymer, TEN-CEM cobalt salt and 4,4'dimethoxybenzophenone were melt compounded using an intermeshing, co-rotating, twin screw extruder manufactured by Leistritz AG. The extruder screw is 18 mm in diameter and the screw length to diameter ratio (L:D) ratio is 40:1. The molten materials were extruded into a water bath and then pelletized. Prior to the compounding, polymers and additives were dried to remove excess moisture. Pellets of these concentrates were then "salt and pepper" blended with pellets of PET (9921W, Eastman Chemical Company) prior to extrusion into film. The ratio of concentrate to PET was approximately 1:9 (by weight). The levels of photoinitiator and TEN-CEM cobalt salt in the concentrate were targeted to yield 500 ppm Co(II) ion and 0.1 ppm photoinitiator in the final blend. The polyether levels in the final blend are shown in Table 11. The concentrates and polyester were dried separately before blending.

TABLE 11

| Ex. # | Conc. (Ex. #) | Matrix polyester | Polyether (wt % final) | Photo-initiator | Photoinitiator (conc) |
|---|---|---|---|---|---|
| 28 | 22 | 9921W | 1 | A | 1 |
| 29 | 23 | 9921W | 4 | A | 1 |
| 30 | 24 | 9921W | 1 | A | 1 |
| 31 | 25 | 9921W | 2 | A | 1 |
| 32 | 26 | 9663 | 10 | B | 0.1 |
| 33 | 27 | 9663 | 4 | B | 0.1 |

A = 4,4'-dimethoxybenzophenone
B = 2(4)-isopropyl-9H-thioxanthen-9-one

Film extrusion, subsequent treatment and testing followed the same general procedure as that given for Examples 1 to 6. Results of the respirometer testing are given in Table 12.

TABLE 12

| Ex. # | Sample form | Sample wt (gm) | Oxygen consumption ($\mu$l $O_2$/min) | Cumulative consumption ($\mu$l $O_2$) |
|---|---|---|---|---|
| 28 | Film | 7.2 | 0.5 | 5000 |
| 29 | Film | 5.9 | 0.4 | 6000 |
| 30 | Film | 7.8 | 0.6 | 8500 |
| 31 | Film | 6.1 | 0.1 | 500 |
| 32 | Gran. | 5.0 | 0.6 | 9000 |
| 33 | Gran. | 5.0 | 0.2 | 4000 |

These examples demonstrate the effectiveness of blending a wide range of polyether copolymers into polyesters and the effectiveness of a wide range of final polyether content. They also demonstrate effectiveness of PEG and PTMG copolymers.

EXAMPLE 34

A melt blend of PET 9663 (Eastman Chemical Company), 22.5% Cobalt TEN-CEM, 2(4)-isopropyl-9H-thioxanthen-9-one and the polyester-polyether copolymer used in Example 27 (with 52 wt % PTMG-1000) was prepared following the procedure described for Example 27. Feed to the extruder was adjusted to yield a final blend with 10 wt % PTMG-1000, 500 ppm cobalt(II) ion concentration and 0.1 wt % 2(4)-isopropyl-9H-thioxanthen-9-one. A 2 mil film was melt pressed from the resulting pellets using the same general procedure as described for example 21, except that a shim was not used to control the film thickness and times and pressures were adjusted to yield a good quality film.

This film was then glued between 3 mil sheets of Mylar (300 gauge Mylar A, General Purpose Grade from DuPont Teijin Films Division) using the following procedure:

Sheets with dimensions of approximately 4 inch×4 inch (10 cm×10 cm) were cut from a roll of the Mylar film. A thin layer of BIPAX TRA-BOND adhesive (manufactured by TRA-CON, Inc.) was placed on top of a Mylar sheet and evened with a brush. The film prepared from PET 9663 and the polyester-polyether copolymer was placed on top of the adhesive. A second layer of BIPAX TRA-BOND adhesive was placed on top of the film prepared from PET 9663 and the polyester-polyether copolymer and evened with a brush. A second piece of Mylar film was placed on top of the second layer of adhesive. A metal bar was rolled across the top of the structure to remove air bubbles and then the entire structure was placed between two smooth metal plates. The sandwich and plates were then placed in a Carver Laboratory Press Model C (Fred S. Carver, Inc.) with a wooden shim between the top plate and the upper platen of the press and the press was tightened until the clamp force reached approximately 5000 lbs. This pressure was maintained for 30 minutes. The sample was removed from the press and carefully separated from the metal plates. The resulting 5 layer (Mylar/adhesive/scavenger/adhesive/Mylar) film was approximately 14 mils thick. The multilayer film was exposed to UV light as described for Examples 1 to 6. After exposure, the oxygen permeability of the multilayer film at 30° C. with humidified test gases and 21% oxygen upstream was <0.6 cc (STP) mil/100 $in^2$/day/atm. The expected value for a similar film with a non-scavenging center layer is >2.5 in the same units. This example demonstrates that the scavengers of the present invention are effective in multilayer structures.

EXAMPLE 35

A 3-neck, 500 ml round bottom flask was charged with 1.8 g poly(tetramethylene glycol) (E. I. du Pont de Nemours and Company) with a number average molecular weight of 1000 g/mol, 1.0 g benzoyl peroxide (Aldrich Chemical Company) and 100 g diethyl phthalate (Aldrich Chemical Company). 1.8 g poly(tetramethylene glycol) represents 0.025 mole tetramethylene glycol repeat units. The flask was equipped with a magnetic stir bar, attached to an MKS Baratron pressure transducer Model 130AD-01000AB through one neck. A thermocouple well was used to seal one neck and the third neck was sealed with a greased glass stopper. The flask was submerged to the necks in a water bath at 55° C. After allowing the flask to thermally equilibrate for a few minutes, the stoppered neck was briefly opened to allow the excess pressure to escape. The temperature of a thermocouple in the well and the pressure were recorded as a function of time using a Camile™ process control system. A pressure drop of 85 torr was recorded after 10 hours.

EXAMPLE 36

A 3-neck, 500 ml round bottom flask was charged with 1.5 g poly(propylene 15 glycol) (Aldrich) with a number average molecular weight of 1000 g/mol, 1.0 g benzoyl peroxide (Aldrich Chemical Company) and 100 g diethyl phthalate (Aldrich Chemical Company). 1.5 g poly(propylene glycol) represents 0.025 mole propylene glycol repeat units. The pressure was recorded in the same manner and under the same conditions as in Example 29. A pressure drop of 32 torr was recorded over 10 hours.

Example 35 and Example 36 (comparative) show that poly(tetramethylene glycol) is a more effective oxygen scavenger than poly(propylene glycol).

EXAMPLE 37

A film with a thickness of approximately 5 mils (125 microns) was extruded using pellets of the material prepared in Example 14. Film extrusion followed the procedure outlined for Examples 1 through 6. The apparent oxygen permeability of the sample was determined. The apparent permeability of the film at 30° C. using 21% oxygen upstream was less than 0.1 cc (STP) mil/100 in²/day/atm vs an expected value of >8 in the same units for a similar film without cobalt catalyst.

This example demonstrates that UV exposure (photo initiation) is not necessarily required for effective scavenging.

Thus, compositions of the present invention surprisingly provide excellent oxygen scavenging characteristics. The compositions of the present invention may be utilized as mono or multilayer structures with similarly good oxygen scavenging effects. The compositions may be fabricated into a variety of useful articles such films, and particularly biaxially oriented film, which are useful for forming packaging materials such as, but not limited to, pouches and flexible film. These compositions may also be formed into rigid containers. The composition may comprise the sidewall, body, seal or lid or may be the entire container.

In the specification, there have been disclosed typical preferred embodiments of the invention and, although specific terms are employed, they are used in a generic and descriptive sense only and not for purposes of limitation.

We claim:

1. A composition comprising a thermoplastic polymer and an oxygen scavenging composition, wherein the thermoplastic polymer comprises: polyesters, polyolefins, polyamides, polyurethanes, styrene: containing polymers and copolymers, polyacrylates, epoxy-amines, polyvinyl chloride, acrylonitrile containing polymers and copolymers, vinylidene chloride containing polymers and copolymers, polycarbonates, and ethylene copolymers and mixtures thereof, and the oxygen scavenging composition comprises: a) an oxidation catalyst, wherein the catalyst comprises at least one transition metal which can readily interconvert between at least two oxidation states; and b) at least one polyether selected from the group consisting of unsubstituted poly(alkylene glycol)s having alkylene chains of 1 to 3 carbon atoms, substituted or unsubstituted poly(alkylene glycol)s having alkylene chains of at least 4 carbon atoms, copolymers of poly(alkylene glycol)s, blends containing poly(alkylene glycol)s and mixtures thereof.

2. The composition of claim 1 wherein said polyether is selected from the group consisting of poly(ethylene glycol), poly(trimethylene glycol), poly(tetramethylene glycol), poly(pentamethylene glycol), poly(hexamethylene glycol), poly(heptamethylene glycol), poly(octamethylene glycol) and mixtures thereof.

3. The composition of claim 2 wherein said poly (alkylene glycol)s comprise poly(ethylene glycol), poly (tetramethylene glycol) and mixtures thereof.

4. The composition of claim 1 wherein said poly(alkylene glycol) has a number average molecular weight of about 500 to about 5000.

5. The composition of claim 1 wherein said polyether comprises a copolymer of poly(alkylene glycol)s selected from the group consisting of alternating, random, segmented, block, graft and branched poly(alkylene glycol) copolymers and mixtures thereof.

6. The composition of claim 5 wherein said copolymer of poly(alkylene glycol)s selected from the group consisting of poly(ethylene glycol)-block-poly(propylene glycol)-block-poly(ethylene glycol) and poly(propylene glycol)-block-poly(ethylene glycol)-block-poly(propylene glycol).

7. The composition of claim 1 wherein said polyether comprises a polymeric or oligomeric either derived from cyclic ether monomers.

8. The composition of claim 7 wherein said cyclic polyether is selected from the group consisting of poly(2,3-dihydrofurandiyl) and polymers derived from monomers of structure I or II, wherein n+m is an integer between 3 and 10, and $R_1$, $R_2$, $R_3$, $R_4$, $R_5$, and $R_6$ are the same or different and are selected from the group consisting of hydrogen atom and lower alkyl groups having 1 to 4 carbons or a halogen atom:

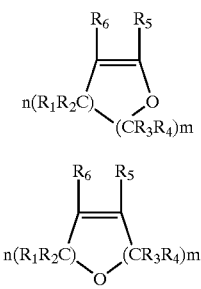

9. The composition of claim 8 wherein said lower alkyl group is selected from the group consisting of alkyls having up to four carbon atoms.

10. The composition of claims 7–9 wherein said polymeric and oligomeric ethers are functionalized at least one terminal end with reactive functionality capable of copolymerizing, grafting, or reactive extruding into or on other polymer compositions on at least one terminal end group.

11. The composition of claim 1 wherein said transition metal comprises a transition metal salt wherein said transition metal is selected from the first, second or third transition series of the Periodic Table.

12. The composition of claim 1 wherein said transition metal is selected from the group consisting of manganese II or III, iron II or III, cobalt II or III, nickel II or III, copper I or II, rhodium II, III or IV and ruthenium I, II or IV.

13. The composition of claim 11 wherein said transition metal salt comprises at least one counterion for the metal selected from the group consisting of chloride, acetate, acetylacetonate, stearate, palmitate, 2-ethylhexanoate, neodecanoate, naphthenate and mixtures thereof.

14. The composition of claim 11 wherein said transition metal salt comprises an ionomer and said oxidation catalyst further comprises a polymeric counterion.

15. The composition of claim 1 wherein said thermoplastic polymer is present in amounts up to about 99.9 weight percent of said total composition.

16. The composition of claim 1 wherein said thermoplastic polymer is selected from the group consisting of polyesters, polyamides, polyolefins, polycarbonates, EVOH and mixtures thereof.

17. The composition of claim 1 further comprising at least one antioxidant in an amount effective to improve the stability of the poly(alkylene glycol).

18. The composition of claim 17 wherein said antioxidant is selected from the group consisting of hindered phenols, phosphites, primary antioxidants, secondary antioxidants, hindered amine light stabilizers and mixtures thereof.

19. The composition of claim 17 wherein said antioxidant is selected from the group consisting of 2,6-di-(t-butyl)-4-methylphenol (BHT), 2,2'-methylene-bis(6-t-butyl-p-cresol), triphenylphosphite, tris-(nonylphenyl)phosphite, dilaurylthiodipropionate, Irganox 1010 (pentaerythritol tetrakis(3-(3,5-di-tert-butyl-4-hydroxyphenol) proprianate)) and mixtures thereof.

20. The composition of claim 17 wherein said antioxidant is present in an amount from about 10 ppm to about 10,000 ppm.

21. The composition of claim 1 further comprising at least one photoinitiator.

22. The composition of claim 21 wherein said photoinitiator is selected from the group consisting of singlet oxygen generating photosensitizers, polymeric photoinitators, substituted aryl ketones, α,β-diketones and mixtures thereof.

23. The composition of claim 21 wherein said photoinitiator is selected from the group consisting of benzophenone, o-methoxybenzophenone, acetophenone, o-methoxy-acetophenone, acenaphthenquinone, methyl ethyl ketone, valerophenone, hexanophenone, α-phenylbutyrophenone, p-morpholinopropiophenone, dibenzosuberone, 4-morpholinobenzophenone, benzoin, benzoin methyl ether, 4-o-morpholinodeoxybenzoin, p-diacetylbenzene, 4-aminobenzophenone, 4'-methoxyacetophenone, α-tetralone, 9-acetylphenanthrene, 2-acetylphenanthrene, 10-thioxanthenone, 3-acetylphenanthrene, 3-acetylindole, 9-fluorenone, 1-indanone, 1,3,5-triacetylbenzene, thioxanthen-9-one,xanthene-9-one,7H-benz[de]anthracen-7-one, benzoin tetrahydropyranyl ether, 4,4'-bis(dimethylamino)-benzophenone, 1'-acetonaphthone, 2'-acetonaphthone, acetonaphthone and 2,3-butanedione, benz[a]anthracene-7,12-dione, 2,2-dimethoxy-2-phenylacetophenone, α,α-diethoxyacetophenone, α,α-dibutoxyacetophenone, Rose Bengal, methylene blue, tetraphenyl porphyrin, zinc phthalocyanine, poly(ethylene carbon monoxide), oligo[2-hydroxy-2-methyl-1-[4-(1-methylvinyl)phenyl]propanone], 2(4) isopropyl thioxanthen-9-one and mixtures thereof.

24. The composition of claim 21 wherein said photoinitiator is selected from the group consisting of 10-thioxanthenone, thioxanthen-9-one, xanthene-9-one and 2(4) isopropyl thioxanthen-9-one.

25. The composition of claim 24 wherein said photoinitiator is present in an amount from about 10 ppm to about 10,000 ppm.

26. The composition of claim 1 wherein said poly (alkylene glycol) comprises at least about 5 weight % of said oxygen scavenging composition.

27. The composition of claim 1 wherein said poly (alkylene glycol) comprises at least about 10 weight % of said oxygen scavenging composition.

28. The composition of claim 1 wherein said poly (alkylene glycol) comprises between about 10 and about 15 weight % of said oxygen scavenging composition.

29. The composition of claim 1 wherein said polyether is a copolymer of poly(alkylene glycol) or a blend containing poly(alkylene glycol) and is present in an amount at least about 2 weight % of said oxygen scavenging composition.

30. The composition of claim 1 wherein said polyether is a copolymer of poly(alkylene glycol) or a blend containing poly(alkylene glycol) and is present in an amount at least about 4 weight % of said oxygen scavenging composition.

31. A method for improving the stability of a composition comprising a thermoplastic polymer and an oxygen scavenging composition, wherein the thermoplastic polymer comprises one or more of: polyesters, polyolefins, polyamides, polyurethanes, styrene containing polymers and copolymers, polyacrylates, epoxy-amines, polyvinyl chloride, acrylonitrile containing polymers and copolymers, vinylidene chloride containing polymers and copolymers, polycarbonates, and ethylene copolymers and mixtures thereof, and the oxygen scavenging composition comprises: a) an oxidation catalyst, wherein the catalyst comprises at least one transition metal which can readily interconvert between at least two oxidation states; and b) at least one polyether selected from the group consisting of unsubstituted poly(alkylene glycol)s having alkylene chains of 1 to 3 carbon atoms, substituted or unsubstituted poly(alkylene glycol)s having alkylene chains of at least 4 carbon atoms, copolymers of poly(alkylene glycol)s, blends containing poly(alkylene glycol)s and mixtures thereof, wherein the method comprises incorporating an antioxidant in the thermoplastic polymer/oxygen scavenging composition.

32. An article comprising at least one layer comprising a thermoplastic polymer and an oxygen scavenging composition wherein the thermoplastic polymer comprises polyesters, polyolefins, polyamides, polyurethanes, styrene containing polymers and copolymers, polyacrylates, epoxy-amines, polyvinyl chloride, acrylonitrile containing polymers and copolymers, vinylidene chloride containing polymers and copolymers, polycarbonates, and ethylene copolymers and mixtures thereof, and the oxygen scavenging composition comprises: a) an oxidation catalyst wherein the catalyst comprises at least one transition metal which can readily interconvert between at least two oxidation states; and b) at least one polyether selected from the group consisting of unsubstituted poly(alkylene glycol)s having alkylene chains of 1 to 3 carbon atoms, substituted or unsubstituted poly(alkylene glycol)s having alkylene chains of at least 4 carbon atoms, copolymers of poly(alkylene glycol)s, blends containing poly(alkylene glycol)s and mixtures thereof.

33. The article of claim 32 wherein said is selected from the group consisting of film, sheet, tubing, profiles, pipes, fiber, containers, preforms, thermoformed articles and flexible bags.

34. The article of claim 32 wherein said is selected from the group consisting of film, sheet, tubing, profiles, pipes, fiber, containers and preforms.

35. The article of claim 32 wherein said article is a container or a preform comprising at least three layers in at least a portion of said article.

36. The article of claim 35 wherein said one layer comprising the thermoplastic polymer/oxygen scavenging composition comprises an intermediate layer disposed between a first and third layer each of which comprises at least one polyester.

37. The article of claim 36 wherein the thermoplastic polymer comprises a recycled polyester.

38. The article of claim 32 wherein said article is a container or a preform comprising at least four layers in at least a portion of said article.

39. The article of claim 38 wherein said one layer comprising the thermoplastic polymer/oxygen scavenging composition comprises an intermediate layer disposed between a first and fourth layer each of which comprises at least one polyester.

40. The article of claim 39 wherein the thermoplastic polymer is recycled polyester.

41. The article of claim 39 wherein a second intermediate layer comprises at least one performance polymer.

42. The article of claim 41 wherein said performance polymer comprises polyamide or EVOH.

43. The article of claim 42 wherein said polyamide further comprises platelet particles dispersed therein.

44. The composition of claim 1 wherein said polyether comprises a cyclic polyether.

45. The composition of claim 44 wherein said cyclic polyether is selected from the group consisting of crown ethers such as 12-crown-4 (1,4,7,10-tetraoxacyclododecane), 15-crown-5 (1,4,7,10,13-pentaoxaeyclopentadecane), or 18-crown-6 (1,4,7,10,13,16-hexaoxacyclooctadecane) and mixtures thereof.

46. The composition of claim 44–45 wherein said cyclic polyether is functionalized with reactive functionality capable of copolymerizing, grafting, or reactive extruding into or on other polymeric compositions.

47. The composition of claim 1 having less than about 5% haze and less than about 1 cc(stp)mil/100 in$^2$/day/atm in a 5 mil extruded film.

* * * * *